United States Patent
Wehrenberg

(10) Patent No.: US 8,031,569 B2
(45) Date of Patent: Oct. 4, 2011

(54) PLAYING DATA FROM AN OPTICAL MEDIA DRIVE

(75) Inventor: Paul J. Wehrenberg, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 583 days.

(21) Appl. No.: 12/118,672

(22) Filed: May 9, 2008

(65) Prior Publication Data

US 2009/0279393 A1    Nov. 12, 2009

(51) Int. Cl.
*G11B 20/10*    (2006.01)

(52) U.S. Cl. .................. 369/47.33; 369/30.04; 369/47.5

(58) Field of Classification Search .............. 369/30.04, 369/47.33, 47.5; 725/89; 367/30.04, 47.33, 367/47.5, 13; 358/115; 707/703
See application file for complete search history.

(56) References Cited

U.S. PATENT DOCUMENTS

| | | | |
|---|---|---|---|
| 5,627,805 A | | 5/1997 | Finkelstein et al. |
| 6,101,153 A * | | 8/2000 | Shimazaki et al. .......... 369/13.1 |
| 6,115,337 A * | | 9/2000 | Takagi et al. .............. 369/47.33 |
| 6,246,640 B1 * | | 6/2001 | Shimazaki et al. .......... 369/13.1 |
| 6,434,748 B1 * | | 8/2002 | Shen et al. ...................... 725/89 |
| 6,578,106 B1 | | 6/2003 | Price |
| 6,647,499 B1 | | 11/2003 | Morcom |
| 6,879,774 B1 | | 4/2005 | Kirk |
| 6,968,468 B2 | | 11/2005 | Lam |
| 7,050,190 B2 * | | 5/2006 | Yamazaki et al. ........... 358/1.15 |
| 7,333,413 B2 | | 2/2008 | Shen |
| 2004/0202073 A1 | | 10/2004 | Lai et al. |
| 2005/0002654 A1 | | 1/2005 | Shiah et al. |
| 2006/0114784 A1 | | 6/2006 | Ma et al. |
| 2007/0067297 A1 * | | 3/2007 | Kublickis ......................... 707/9 |
| 2007/0195661 A1 | | 8/2007 | Raaymakers |
| 2009/0279398 A1 * | | 11/2009 | Altare .......................... 369/47.5 |

* cited by examiner

*Primary Examiner* — Thuy Pardo
(74) *Attorney, Agent, or Firm* — Schwegman, Lundberg & Woessner, P.A.

(57) ABSTRACT

Example embodiments provide various techniques for playing data from an optical media drive. The optical media drive may detect certain media access information for use in accessing optical media. This media access information is stored in a memory that is configured to retain the media access information after the optical media drive is deactivated. The optical media drive reads the data from an optical media and this data is transferred to a buffer until, with reference to some threshold parameter, the optical media drive is deactivated. The optical media drive may be reactivated in reference to another threshold parameter and the media access information is thereafter retrieved from the memory. The optical media drive may then read from the optical media using the provided media access information.

17 Claims, 10 Drawing Sheets

PLAYING DATA FROM AN OPTICAL MEDIA DRIVE

FIELD

The present disclosure relates generally to optical media drives and to systems using such optical media drives; as well as to improved methods of operating such optical media drives. In an example embodiment, the disclosure relates to playing data from an optical media drive.

BACKGROUND

An optical media drive facilitates reading of different types of data that may be stored on an optical media, of which Compact Disks (CD's) and Digital Versatile Discs (DVD's) are common examples. The optical media is a circular disk having a generally flat surface, with data stored in the form of pits formed on the flat surface of the disk, or in some other optically identifiable form. The optical media drive uses light (e.g., a laser) to read data stored on the optical media, for use by a processing system, and in some cases to write data to the optical media. In the example case of video data, the optical media drive reads the video data from the optical media and passes the video data to a video player, which may be implemented in either hardware or software. The video data is passed to the video player in a streaming fashion, where the video data may be decoded, decompressed, and displayed as video/audio output. In many conventional systems, during playback of video, an optical media drive is configured to constantly read the video data at a rate generally equivalent to the rate at which the video data is processed or displayed. As a result, the optical media drive rotates the optical media at a constant rate throughout the playback of the video, thereby requiring that the optical media drive operate continuously for the duration of the video playback. Such systems thereby draw power continuously during video playback and this continuous power consumption may, for example, quickly reduce the charge of a battery when viewing the video using a battery-powered video player.

Additionally, systems have been proposed for reading data having a limited data usage rate, such as video data, from an optical media drive into a buffer, and then placing the optical media drive in a lower power state until the contents of the buffer need to be replenished in order to continue video playback. However, such systems typically still continue to draw power from the optical media drive during video playback even in the lower power state. Additionally, once many such systems are revived from the lower power state, the systems typically require reacquiring of access information regarding the loaded optical media, before reading of the desired data may be resumed. Either of these operational situations leads to less than optimal power management for use of the optical media drive. However, power management can be a significant concern when operating many systems, particularly ones that operate from a finite capacity power source, such as a battery.

Accordingly, embodiments of the invention provide new methods and apparatus for power management of optical media drives and for controlling the operations of such optical media drives during read operations. These methods and apparatus offer particular advantages to read operations subject to relatively controlled rates of use of the data read from the optical media, such as multimedia data.

SUMMARY

Example embodiments provide various techniques for playing data from an optical media drive. In general, examples of the invention as described herein allow for efficient reduction of power consumption by optical media drives. The examples are described herein primarily in the context of reading of audio, video, audio/video and other multimedia data files, as such data typically has a fixed rate at which the data may be played back, or otherwise utilized, and thus provides a particularly useful context for describing the benefits of the described invention.

When an optical media is loaded into an optical media drive, the optical media drive may detect certain media access information for use in accessing the optical media. Such media access information may include attributes of the optical media and parameters used by the optical media drive to access the particular loaded optical media. The optical media drive stores this media access information in a memory that is configured to retain the media access information even after the optical media drive is deactivated.

The optical media drive reads the data from the optical media at a data read speed greater than a playback speed used in the playback of the data. As an example, the optical media drive can read the optical media at its maximum data read speed. This read data is initially transferred to a buffer until the buffer is filled or another threshold is reached; at which time the optical media drive is deactivated.

With the optical drive deactivated, a multimedia player application or other software application reads or plays the data from the buffer until the buffer is nearly empty or another threshold is reached. At this time, the optical media drive is reactivated and the media access information previously stored in the memory is provided to the optical media drive. The optical media drive may then immediately read from the optical media using the provided media access information without a requiring the media access information to be redetected.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As used herein, accessing data stored on an optical media refers to reading data from the optical media. The optical media drive may be configured to read virtually any one or more types of rotatable optical media, of which the following are well-known conventional types as of the filing of this application: Compact Disk (CD), CD-Recordable (CD-R), CD read-only memory (CD-ROM), CD ReWritable (CD-RW), Laserdisc (LD), MiniDisc (MD), Digital Versatile Disc (DVD), DVD-R, DVD+R, DVD+RW, DVD-R dual layer, DVD+R dual layer, High-Definition Digital Versatile Disc (HD-DVD), HD DVD-R, HD DVD-RW, Blue-ray Disc, Blue-ray Disc-R, and Blue-ray Disc-RE,. It should be appreciated that new optical media types and formats are continually developed, and thus the use of the embodiments of the present invention is not confined to only the above-identified popular formats.

Optical media drives may be used with many types of processing systems. For the purposes of this specification, a "processing system" includes a system using one or more processors, microcontrollers and/or digital signal processors having the capability of running a "program," which is a set of executable machine code. A "program," as used herein, includes user-level applications as well as system-directed applications or daemons. Processing systems include communication and electronic devices such as cell phones, music players, and Personal Digital Assistants (PDA); as well as computers, or "computing devices" of all forms (desktops, laptops, servers, palmtops, and other computing devices).

Figure 1A:
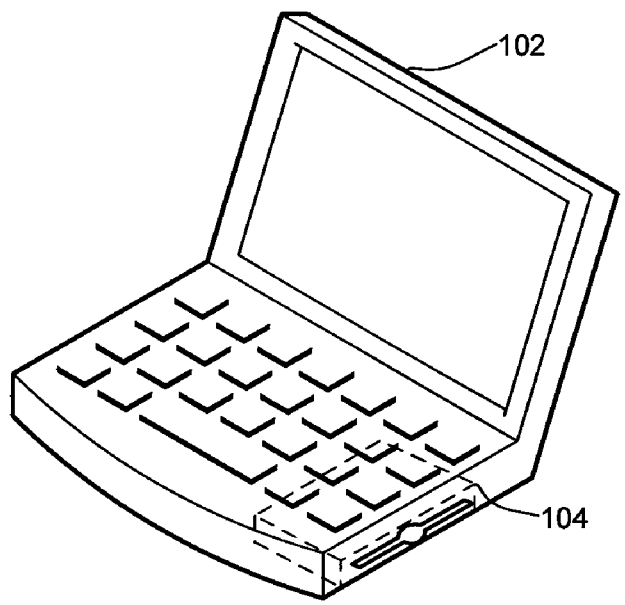
FIGS. 1A and 1B depict examples of processing systems using optical media drives.

One use of optical media drives is in computing devices. FIG. 1A depicts an example computing device in the form of a laptop computer 102. The laptop computer 102 includes an optical media drive 104 designed to fit internally within the laptop computer 102. The optical media drive 104 is connected to the laptop computer 102 and the laptop computer 102 uses the optical media drive 104 to read and/or write data stored on an optical media (not shown). Additionally, it should be appreciated that laptops and other computers may also be used with optical media drives that are external to the computer, and are connected to the computer by a suitable data link, such as a USB or Firewire connection.

Figure 1B:
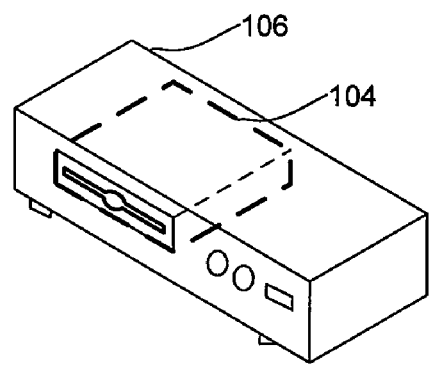

FIG. 1B depicts another example of a processing device in the form of a DVD player 106. The DVD player 106 includes an optical media drive 104 designed to fit internally within the DVD player 106. The DVD player 106 is configured to play videos stored on DVDs, as well as data on other optical media types, and can interface with computers and/or home theater systems that include, for example, audio receivers, televisions, and other devices.

Figure 2:
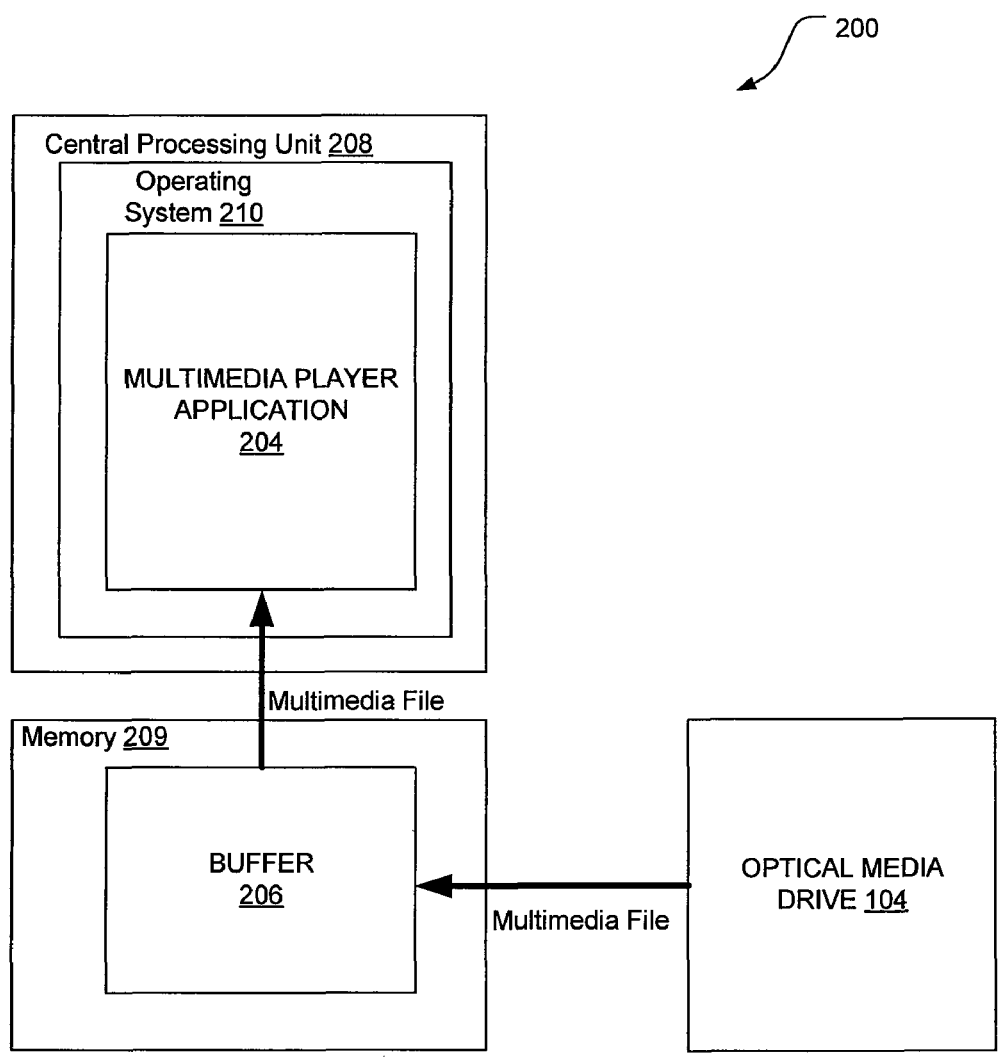
FIG. 2 depicts a block diagram of an example of a computing device, in accordance with an example embodiment, configured to read data from optical media drive.

FIG. 2 depicts a block diagram of an example of a computing device 200, in accordance with an example embodiment, configured to read data from optical media drive 104. The computing device 200 includes central processing unit 208 that may directly access memory 209 and is in communication with optical media drive 104. Optical media drive 104 may be an integrated unit with the remainder of computing device 200, such as being contained within a single case or other housing, or as noted above may be discrete, but selectively attachable (such as through a Universal Serial Bus (USB) or similar connection) to the remainder of computing device 200. The central processing unit 208 executes operating system 210 that manages the software processes and/or services executing on the computing device 200. As depicted in FIG. 2, these software processes and/or services may include multimedia player application 204. As explained in more detail below, the computing device 200 also includes buffer 206 that is configured to temporarily store data read from the optical media drive 104.

The multimedia player application 204 is a computer application used to play data in the form of a multimedia file. A multimedia file is a collection of data including data content of one or more of audio, text, image, and video data. Other types of data may also be included within such a file. One example of a multimedia file is a video file, such as an Moving Picture Experts Group (MPEG) file, an Audio Video Interleave (AVI) file or a QuickTime file. Another example of a multimedia file is an audio file, such as a "Red Book" standard CD, an MPEG Layer-3 (MP3) file, an Advanced Audio Coding (AAC) file or other audio-output-only media files. Multimedia player application 204 may be a dedicated application for that purpose, or may be any other application that alone, or in conjunction with associated hardware, is capable of taking a data stream from optical media drive 104 and reproducing an appropriate media output for visual, auditory, and/or tactile perception by a user. In a video stream, for example, video data synchronized with corresponding audio data would be output, respectively, to a display and to sound reproduction devices, such as speakers or headphones.

The optical media drive 104 receives and loads the optical media that stores one or more multimedia files. The optical media drive 104 is capable of reading all or a portion of the multimedia file at a data read speed (or data rate) that is substantially greater than a playback speed used in the playback of the multimedia file. The "data read speed," as used herein, is the rate of data read by the optical media drive 104. It should be appreciated that the data read speeds of different multimedia content may vary significantly. For example, a high-resolution audio file would require a much higher data read speed than a low resolution file, for a given duration of audio playback.

The multimedia player application 204 may play (or "playback") the multimedia file read from the optical media drive 104 at a particular playback speed. The "playback speed," as used herein, is the data transfer rate required to play the multimedia content. That is, this playback speed is the rate of data transfer from the optical media drive 104 that can sustain a rendering of the multimedia file. For example, the multimedia player application 204 may playback an audio file from a Red Book standard audio CD at a speed of 176 kilobytes/second. Accordingly, adequate functionality may be obtained if the optical media drive 104 reads the CD at approximately 176 kilobytes/second. However, the optical media drive 104 may also read the CD at a higher read speed, such as 48×176 kilobytes/second (or 8.44 megabytes/second). Alternatively, a DVD optical media drive may playback a DVD video file at a playback speed of approximately 1.385 megabytes/second, but may read the video file either at that speed, or at a much higher read speed of 8×1.385 megabytes/second (or approximately 11.08 megabytes/second). In general, the optical media drive 103 may read a multimedia file at a speed that generally correlates to the maximum rotational speed that the optical media drive 104 may spin the optical media and also achieve adequate reliability of data sensing and transfer.

The example embodiments described herein utilize this capability of the optical media drives to read data at a rate substantially in excess of the playback speed in order to cycle the optical drive operation to reduce the ultimate power consumption by the optical media drive. Additionally, the examples provided herein further minimize the time required for a drive to reactivate and to acquire data. As one such example, still referring to FIG. 2, the multimedia file read from the optical media drive 104 is first stored in buffer 206 before being read or transferred to the multimedia player application 204. The buffer 206 is a region of memory 209 used to temporarily hold data (e.g., the multimedia file) while the data is being transferred for use by an application, such as the multimedia player application 204. The memory 209 used as the buffer 206 may be of any memory type capable of providing the buffer data to the central processing unit 208 or other playback mechanism. Accordingly, such memory 209 may be the main system memory (e.g., random access memory (RAM)) directly accessible by a central processing unit 208 within the computing device 200, cache memory, or any other volatile or non-volatile memory used by the computing device 200. The placement or configuration of buffer 206 may vary depending on the particular system design. For example, buffer 206 may be either internal or external to an optical media drive 104, and thus, may be either internal or external to other components in the computing device 200. As will be apparent from the discussion below, this buffer 206 is configured to temporarily store a large amount of data, sufficient to enable duty cycling of the optical media drive 104. For playing video files, the size of the buffer 206 may range from, for example, 100 megabytes to the maximum capacity of the optical media, such as 5 gigabytes for a DVD. In an example, the size of buffer 206 is 500 megabytes. In still another example, for playing audio files, the buffer 206 may range from, for example, 100 megabytes to the maximum capacity of the optical media, such as 740 megabytes for a CD.

In operation, the optical media drive 104 transfers the multimedia file to the buffer 206 until some threshold (or threshold parameter) is reached, such as, for example, a threshold either in terms of time of operation of the optical media drive 104, or a given buffer capacity, for example, when the buffer 206 is full. As will be discussed in more detail below, the optical media drive 104 is then deactivated or shut down, meaning that power is removed from the optical media drive 104, either externally, or by internally switching off power supplied to circuitry within the drive. The multimedia player application 204 retrieves the data from the buffer 206, and thus plays the multimedia file from the buffer 206.

Once an additional threshold is reached, optical media drive 104 is reactivated, thereby enabling the optical media drive 104 to begin reading of data from the optical media. Again, this threshold may be of any desired type, and may be determined based, for example, upon a predetermined or dynamically-determined duty cycle for optical media drive, or may be determined in reference to the amount of data remaining within buffer 206. For example, the threshold might be determined in reference to the amount of data remaining within buffer 206 in reference to the rate at which such data is being read for playback, as compared to the time required for the system to reactivate optical media drive 104, to read data from the optical media and to then write the data into buffer 206. Once the optical media drive 104 is reactivated, the optical media drive 104 may then read a next portion of the multimedia file (if any) into the buffer 206. This next portion of the multimedia file may again be stored in the buffer 206 until some threshold (which may or may not be same as that previously utilized), at which time the optical media drive 104 is deactivated again. The operations discussed above repeat until the complete multimedia file is read or until data is no longer needed played by the multimedia player application 204 (such as if viewing of video was suspended or terminated before the end).

Figure 3:
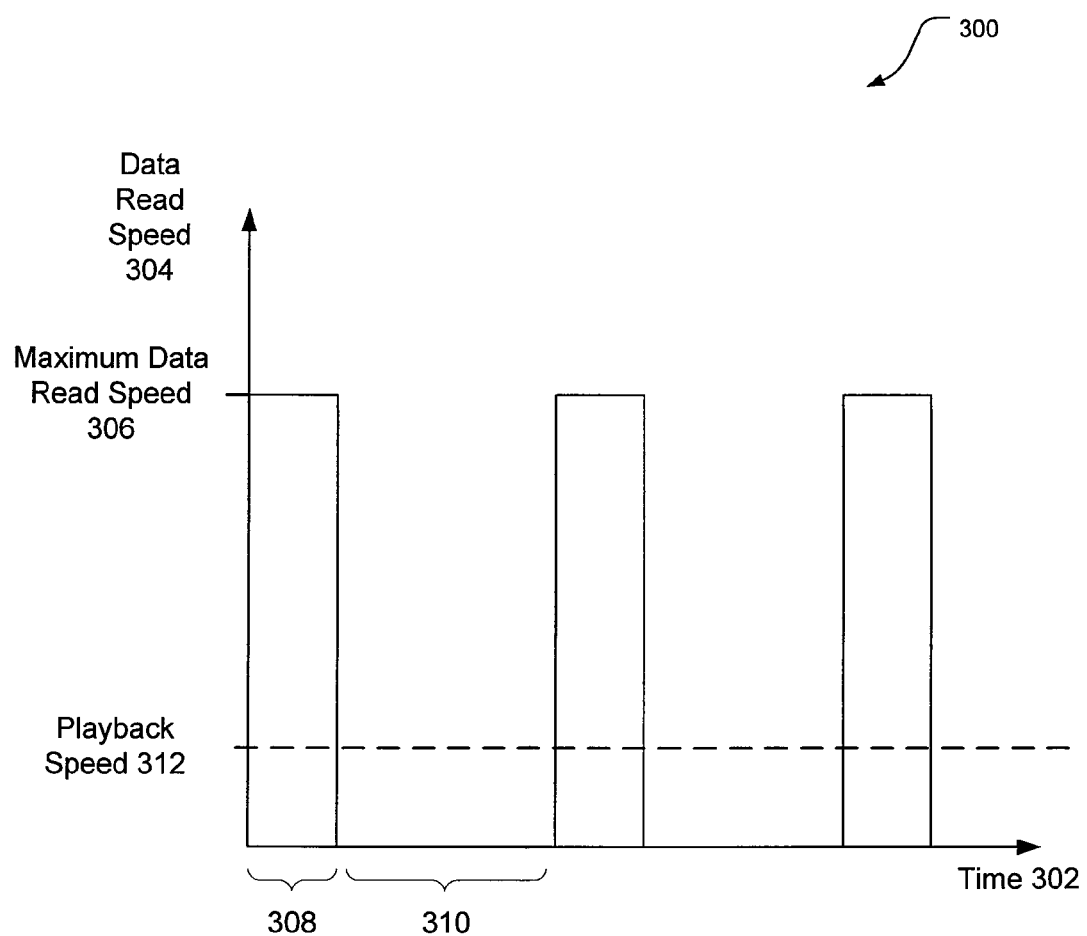
FIG. 3 depicts a graph diagram illustrating a duty cycle of an optical media drive, in accordance with an example embodiment.

FIG. 3 depicts a graph diagram 300 illustrating a duty cycle of an optical media drive, in accordance with an example embodiment. The depicted example has been idealized for the purposes of illustrating the invention. It should be appreciated that some optical media drives may be operated in such a manner that data read speeds ramp upwardly or downwardly, rather than the instantaneous stop and start as depicted. Embodiments of the present invention described herein are provided to improve the speed with which an optical media drive, once activated to read data from an optical media and then deactivated, may be reactivated to begin reading data from the optical media.

The graph diagram 300 includes horizontal axis 302 and vertical axis 304 at right angles to each other. The horizontal axis 302 defines time, which increases from left to right. The vertical axis 304 defines a read speed of the optical media drive, which increases from bottom to top. As an example, a first point (not shown) located above a second point on the vertical axis 304 defines a higher read speed than a read speed defined by the second point. The graph diagram 300 therefore is a plot of the read speed of an optical media drive over a period of time. For reference, dashed line 312 depicts an example playback speed that might be met by the depicted optical drive duty cycle.

The optical media drive initially reads data stored on an optical media at a data read speed greater than a playback speed used in the playback of the data. In an example read operation, as depicted in the graph diagram 300, the optical media drive initially reads the data from the optical media at a maximum data read speed 306 of the optical media drive. The optical media drive transfers the data read from the optical media to a buffer for a period of time 308 until, for example, the buffer is full or, as described in more detail below, or some threshold parameter is reached. Thereafter, the optical media drive is deactivated by switching off power completely to the optical media drive. During a period of time 310 that the optical media drive is deactivated, a multimedia player application, for example, may read or play the data from the buffer. Once the buffer is nearly empty or, as explained in more detail below, reaches another threshold, the optical storage media drive is reactivated and the optical media drive may then read a next portion of the data. The operations of reading the data at maximum data read speed 306 and then deactivating the optical media drive repeat until all the requested data is read from the optical media.

As a result, the power used by the optical media drive in reading data may be reduced when compared to, for example, keeping the optical media drive continuously powered on to read the requested data at a constant data read speed. In an example estimate, duty cycling of an optical media drive reading a 7.72 GB video file at a rate facilitated by a 500 MB buffer would save approximately 14% of battery power when compared to conventional playback methods.

Figure 4:
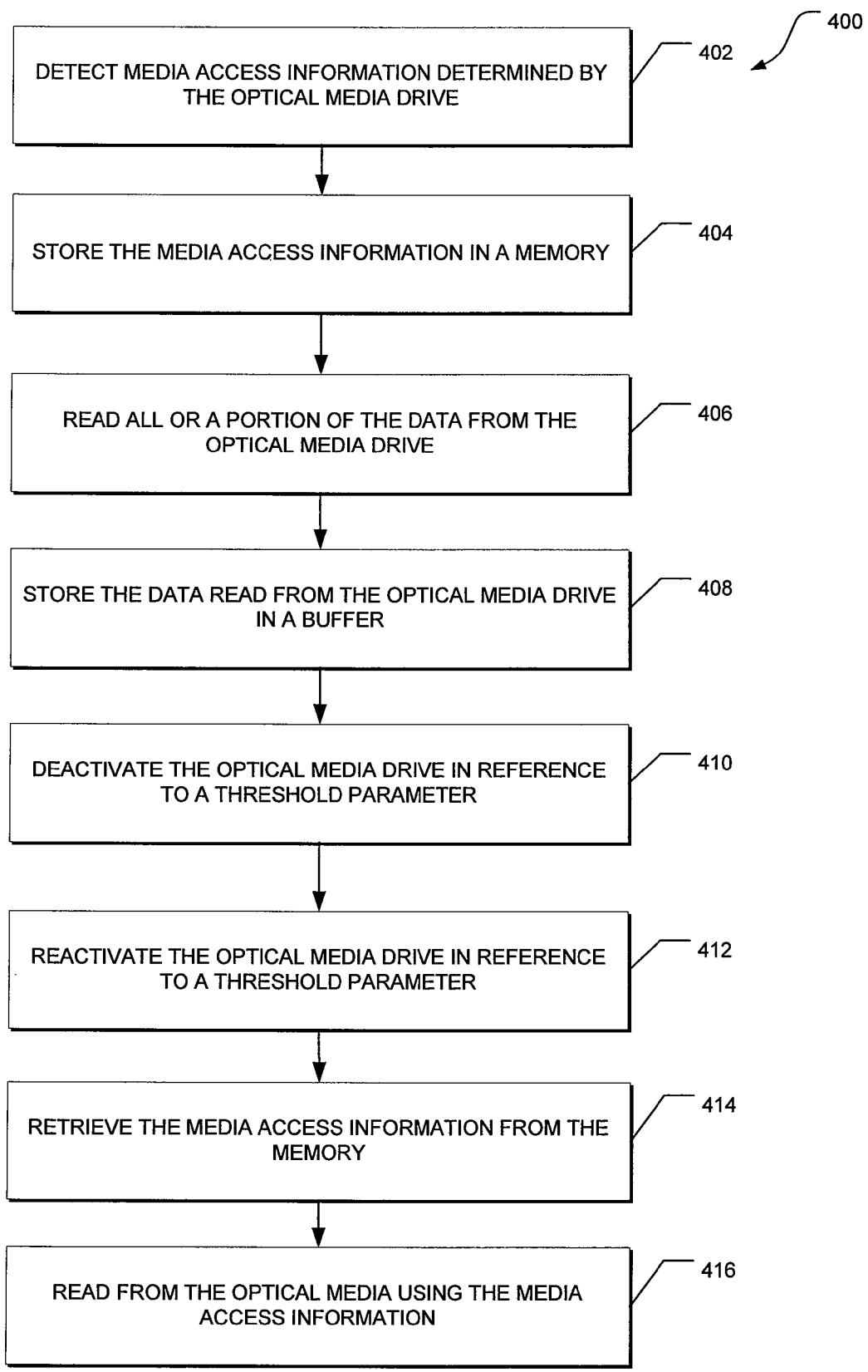
FIG. 4 depicts a flow diagram of a general overview of a method, in accordance with an example embodiment, for reading data from an optical media drive.

FIG. 4 depicts a flow diagram of a general overview of a method, in accordance with an example embodiment, for reading data from an optical media drive. In an example embodiment, method 400 may be implemented by the multimedia player application 204 of FIG. 2 and employed in computing device 200. As depicted in FIG. 4, media access information is detected at 402 when an optical media is loaded into the optical media drive. With conventional optical media drives, once an optical media is loaded into the drive, the drive detects particular information regarding the optical media to facilitate access to the optical media, as necessary to read data from the media. The "media access information" as used herein, is such information determined from the optical media by the optical media drive, either by reading the information from the media or through operation of the media (as described below), which information is necessary for the drive to read other data, such as multimedia data, from the drive.

In an example embodiment, the media access information includes attributes of the optical media. An attribute is a characteristic or property of the optical media. One example of an attribute that is typically determined is the type of optical media, such as the specific one of those conventional types of optical media noted earlier herein. Another example attribute is the storage capacity of the optical media, such as 650 megabytes, 4.7 gigabytes, and other capacities. A further example attribute is the manufacturer identifier, which is a value that identifies the manufacturer of the optical media. Other example attributes include maximum transfer rate, recording density, data zone allocation, format information, and other attributes. The optical media may store the attributes in the lead-in area, which is an area marking the start of a session on the optical media. For example, the DVD lead-in area is an area comprising physical sectors 1.2 mm wide or more, located adjacent to the inside of a control data area, which is an area reserved for storing media access information. Alternatively, the optical media drive may detect the attribute itself. For example, the optical media drive may identify an optical media type based on the reflectivity of a radio frequency (RF) modulated signal reflected off the optical media and on the number of data layers.

In another example embodiment, the media access information includes parameters associated with accessing the optical media. Here, a parameter is a variable used by the optical media drive in accessing the optical media. The optical media drive may determine this parameter itself. An example of a parameter is an RF gain, which is used by the optical media drive to detect RF modulated signal, which is produced by laser light, reflected off the optical media. Another example parameter is focus servo gain and compensation, which controls the distance between the optical media and the objective lens. A further example parameter is the gain and compensation offset of the servos used to further control and refine the movement of the objective lens, such as a tracking movement and a tilt movement. The tracking movement is in the radial direction. The tilt movement is angular adjustment of the optical axis of the objective lens with respect to the normal to the optical media disc surface. Yet another example of a parameter is a disk imbalance parameter, which the optical media drive may detect and subsequently use to determine the maximum rotational speed to allow for the optical disc mounted on the optical media drive spindle. In most optical media drives, this disk imbalance parameter is detected by spinning the optical media at a high rotational speed. The optical media drive then calculates the disk imbalance parameter based on a tracking servo error signal acquired during the spin. Other example parameters include track pitch, linear velocity, bit rate, modulation, wavelength of playback laser, and other parameters. The optical media drive may, for example, determine the above-referenced parameters based on the attribute of the optical media and may continuously adjust such parameters during access to, for example, maximize the RF modulated signal reflected off the optical media.

It should be appreciated that upon reactivation (and also loading of optical media), the media access information most optical media drives first attempt to detect is the optical media type. Most optical media drives at least detect the type of optical media before being able to read data (e.g., multimedia file) stored on the optical media.

As discussed above, certain media access information may be stored on the optical media. Here, the optical media drive may detect the media access information by reading the media access information from the optical media. Alternatively, detection may include the optical media drive itself determining the media access information by, for example, calculating the media access information. The optical media drive stores the media access information in a memory at 404. This memory is configured to retain the media access information even after the optical media drive is deactivated. As will be explained in detail below, in an example embodiment, the memory may be a non-volatile memory included in the optical media drive. In another example embodiment, the memory may be a memory located externally from the optical drive, such as the main system memory used by a computing device.

Still referring to FIG. 4, the optical media drive is then instructed to read all or a portion of data at 406. The data read from the optical media is stored in a buffer at 408. Once the buffer reaches some threshold parameter, as discussed previously, the optical media drive is deactivated at 410. As noted before, the threshold parameter may define, directly or indirectly, a buffer loading that when reached, causes the optical media drive to be deactivated. The buffer loading (or buffer capacity) identifies an amount of data stored in a buffer. The threshold parameter may be set to a variety of different buffer capacities. In an example, the threshold parameter may be set to correlate to the maximum amount of data that can be stored in the buffer. Therefore, in this example, the optical media drive may be deactivated once the buffer is full. Other examples of threshold parameters include 80% of maximum capacity, 70% of maximum capacity, and other threshold parameters.

The data stored in the buffer is then read or played until the buffer capacity is reduced below a threshold parameter. In an example embodiment, this threshold parameter will represent, again directly or indirectly, a remaining buffer capacity, at which point it is deemed advisable to write a next portion of the multimedia data into the buffer. Once the content of the buffer reaches this threshold parameter, the optical media drive is reactivated at 412. With reactivation, the media access information is retrieved from the memory at 414. Since the media access information is stored in a memory that is configured to retain the media access information even after the optical media drive is deactivated, the optical media drive will preferably skip detection of the media access information when the optical media drive is reactivated; but will instead use the media access information stored in the memory to access the optical media because the optical media has not changed. This retrieval of the media access information from memory is faster than detecting the same media access information again. Accordingly, upon reactivation, the optical media drive can quickly transition to reading data from the optical media using the retrieved media access information at 416. This quicker transformation from a deactivated state to reading of data allows a shorter period of activation of the optical media drive to read a given amount of data; and over multiple cycles of activation and deactivation facilitates a relatively shortened total time of drive operation relative to conventional systems. It should be appreciated that different optical media drives and different processing systems may obtain different types of media access information, and in different ways, and therefore the precise magnitude of shortening of the period of drive operation may be expected to vary from one system to another, and potentially between one type of optical media and another.

Figure 5:
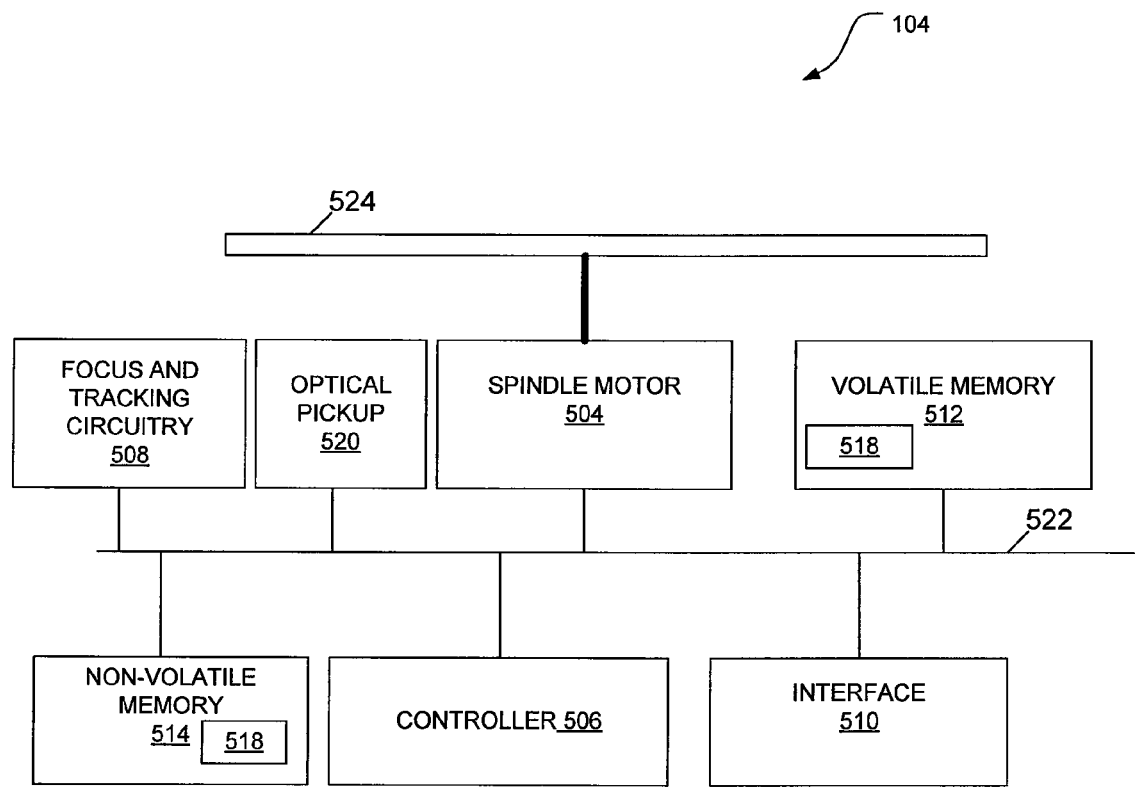
FIG. 5 depicts a diagrammatic representation of an optical media drive, in accordance with an example embodiment, within which the media access information may be stored.

FIG. 5 depicts a diagrammatic representation of an optical media drive 104, in accordance with an example embodiment, within which the media access information 518 may be stored. The optical media drive 104 includes focus and tracking circuitry 508, optical pickup 520, spindle motor 504, volatile memory 512, non-volatile memory 514, controller 506, and interface 510, which may communicate with each other via bus 522. The spindle motor 504 is configured to rotate optical media 524. The optical pickup 520 detects the modulated RF signal reflected off the surface of optical media 524. The optical pickup 520 can be positioned to read any disk track of optical media 524. Servo mechanisms (not shown) keep the optical pickup 520 positioned over the optical media 524 and may also be used to focus the optical pickup 520. The focus and tracking circuitry 508 tracks particular locations of optical media 524 by calculating placement of the optical pickup 520. In an example, the focus and tracking circuitry 508 may detect media access information such as focus servo gain and compensation, tracking movement, and tilt movement. The focus and tracking circuitry 508 may then transmit such media access information to controller 506. The controller 506 controls the focus and tracking circuitry 508, optical pickup 520, spindle motor 504, and other components of the optical media drive 104. Data read from optical media 524 may be transferred to a central processing unit by way of interface 510.

In an example embodiment, the optical media drive 104 includes a non-volatile memory 514 in addition to volatile memory 512. The controller 506 may use volatile memory 512 as temporary storage for various applications, such as buffering data for transfer to a central processing unit (or another computing device) and storing media access information 518 used to access the optical media 524. In an example embodiment, the controller 506 may also store media access information 518 in non-volatile memory 514. Here, the non-volatile memory 514 is configured to retain the media access information 518 after the optical media drive 104 is deactivated. The non-volatile memory 514 is a type of memory that can retain stored information, such as media access information 518, without power. Examples of non-volatile memory 514 include flash memory (e.g., NAND, NOR, and other flash memories), Electrically Erasable Programmable Read-Only Memory (EEPROM), and other non-volatile memories. When the optical media drive 104 is reactivated, the controller 506 may be configured to retrieve the media access information 518 from the non-volatile memory 514.

It should be noted that when the optical media drive 104 is deactivated, a flow of electric charge to the operative internal circuitry of optical media drive 104 is completely stopped or switched off. That is, power is not supplied to any internal component of the optical media drive 104, such as focus and tracking circuitry 508, spindle motor 504, controller 506, volatile memory 512, non-volatile memory 514, and other components. In effect, the optical media drive 104 upon deactivation is shut down or "turned off." It should be appreciated that in some systems the optical media drive may be switched on and off through use of circuitry that is physically internal to the drive, and thus circuitry sufficient to facilitate such switching operations may continue to have power supplied to them. This does not alter the fact that the optical media drive 104 is functionally "turned off."

Figure 6:
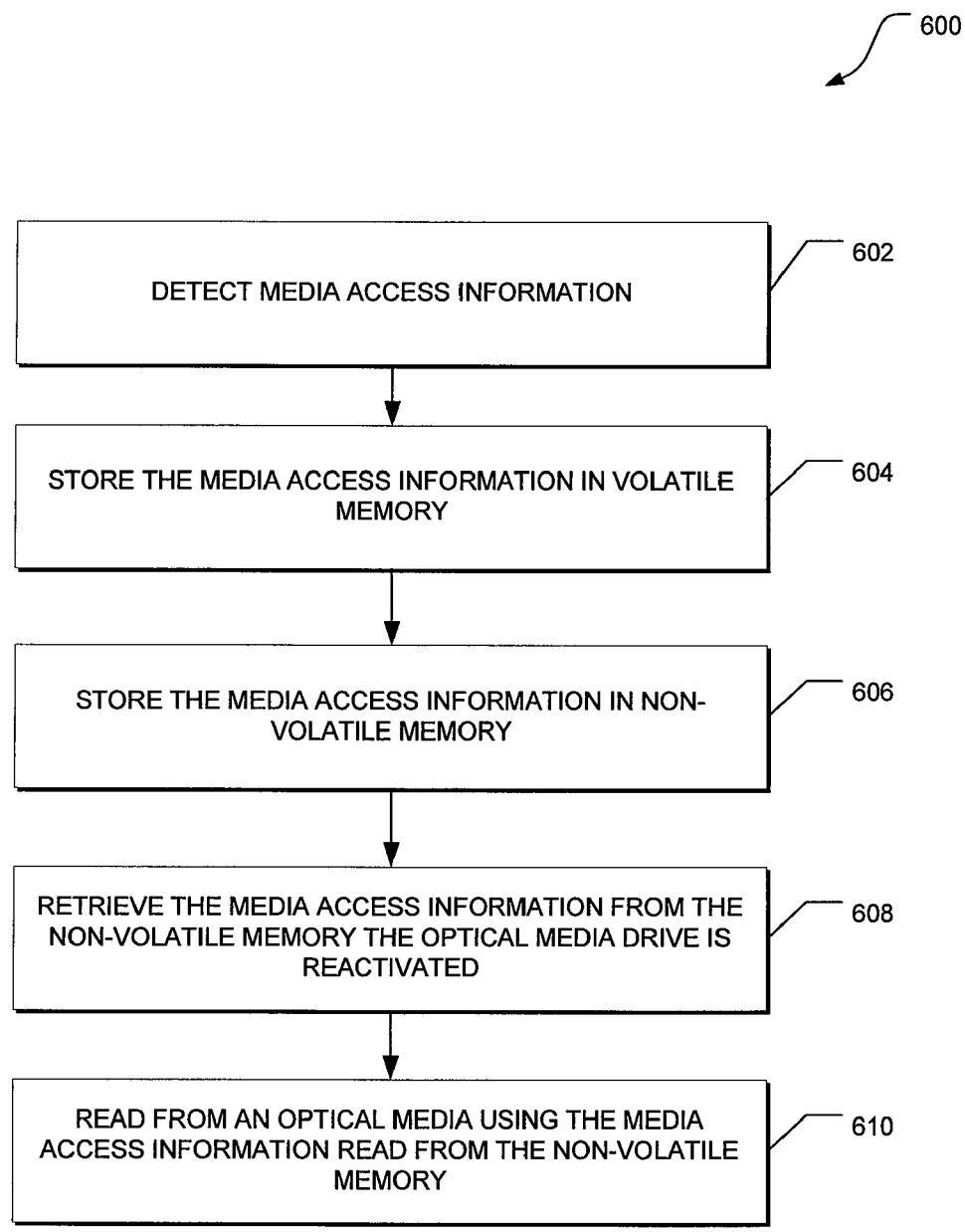
FIG. 6 depicts a flow diagram of detailed methods, in accordance with an example embodiment, of an optical media drive storing media access information in a non-volatile memory.

FIG. 6 depicts a flow diagram of detailed methods, in accordance with an example embodiment, of an optical media drive storing media access information in a non-volatile memory. In an example embodiment, method 600 may be employed in the optical media drive 104 depicted in FIG. 5. As depicted in FIG. 6, the optical media drive detects media access information at 602. In an example embodiment, as discussed above, the optical media drive may detect the media access information by reading the media access information from the optical media. In another example embodiment, the optical media drive may detect the media access information by determining the media access information.

The optical media drive then stores the media access information in a non-volatile memory at 604, included in the optical media drive. Additionally, at 606, the optical media drive will store the media access information in a non-volatile memory included in the optical media drive. Referring to 608, once the optical media drive is reactivated, the optical media drive is programmed to first retrieve the media access information from the non-volatile memory before accessing the optical media. As noted above, the optical media drive will preferably use the previously stored media access information to access the optical media because the optical media has not changed. With the media access information, the optical media drive then reads data from and/or write data to the optical media at 610 using the media access information retrieved from the non-volatile memory.

Figure 7:
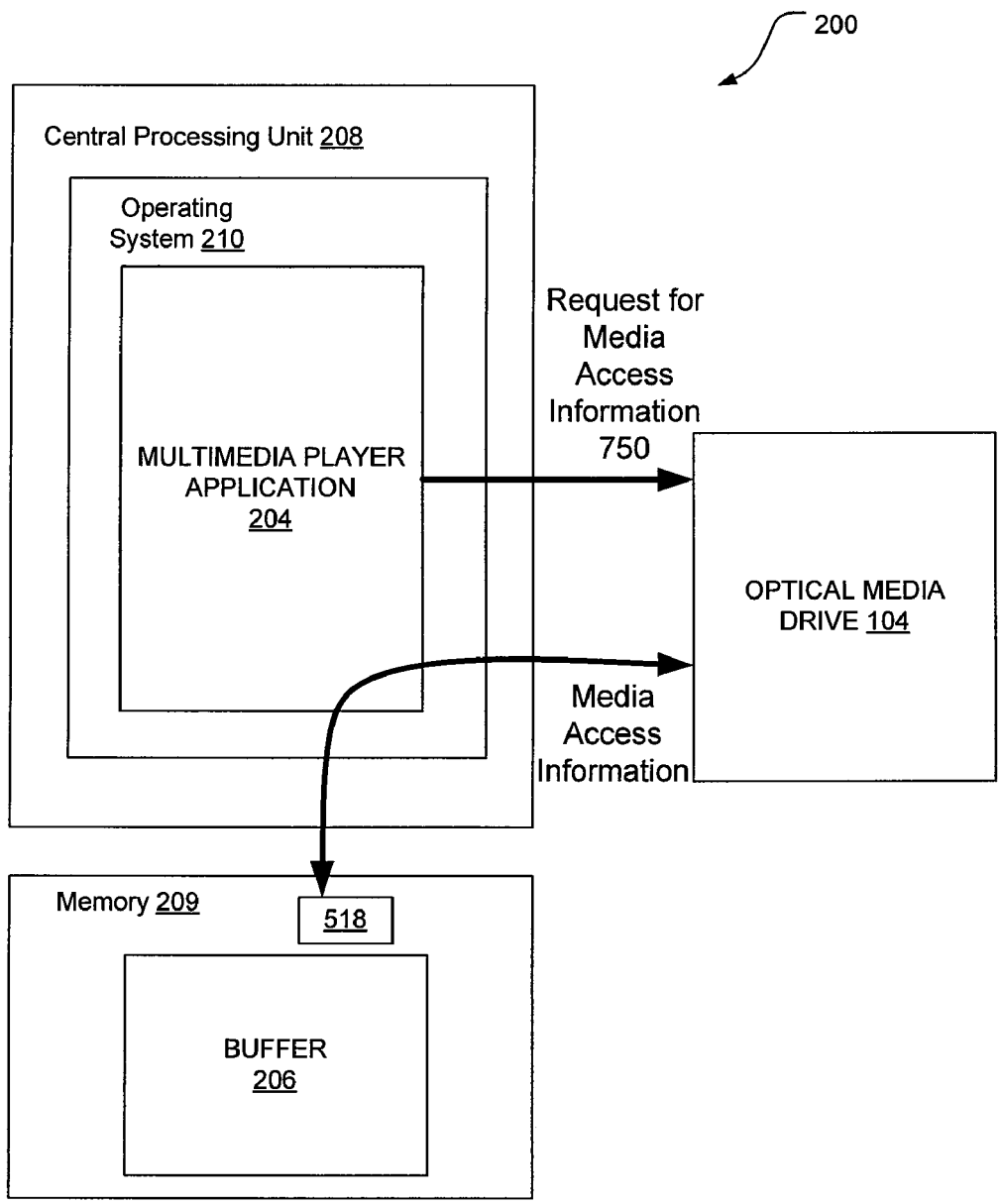
FIG. 7 depicts a block diagram of an example of a computing device, in accordance with an example embodiment, configured to retrieve media access information from an optical media drive.

FIG. 7 depicts a block diagram of an example of a computing device 200, in accordance with an example embodiment, configured to retrieve media access information from an optical media drive 104. The computing device 200 includes central processing unit 208 that may directly access memory 209 and is in communication with optical media drive 104. The central processing unit 208 executes operating system 210 that manages the software processes and/or services executing on the computing device 200. As depicted in FIG. 7, these software processes and/or services may include multimedia player application 204. The computing device 200 also includes buffer 206 that is configured to temporarily store data read from optical media drive 104, which is discussed above.

The optical media drive 104 receives and loads an optical media that stores data in the form of one or more multimedia files. Once the optical media is loaded, the optical media drive 104 detects media access information 518 before reading the multimedia file from the optical media. It should be appreciated that the optical media drive 104 may also detect media access information 518 during access of the optical media and, as discussed above, when the optical media drive 104 is reactivated. In an example embodiment, the multimedia player application 204 may transmit a request 750 to the optical media drive 104 for media access information 518 detected by the optical media drive 104. The multimedia player application 204 may transmit the request 750 when the optical media is initially loaded into the optical media drive 104 or when the optical media drive 104 is accessing the optical media.

Once the optical media drive 104 receives the request 750, the optical media drive 104 transmits the requested media access information 518 to the multimedia player application

204. Upon receipt of the media access information 518, the multimedia player application 204 stores the media access information 518 in a memory 209 or other machine readable media that is configured to retain the media access information after the optical media drive 104 is deactivated. Here, the memory 209 or other machine readable media may be located outside the optical media drive 104. An example of such a memory 209 is the main system memory. Another example of such a memory 209 is a non-volatile memory (e.g., NAND, NOR or other non-volatile memories) included in or connected to the computing device 200. An example of a machine readable media is a hard drive included in or attached to the computing device 200.

The optical media drive 104 reads all or a portion of the multimedia file at a data read speed greater than a playback speed used in the playback of the multimedia file, and this multimedia file is transferred to the buffer 206. Once the buffer is full or its capacity reaches some threshold parameter, the optical media drive 104 is deactivated. Once the buffer 206 is nearly empty or its capacity reaches a different threshold parameter, the optical media drive 104 is reactivated. The multimedia player application 204 may then retrieve the media access information 518 from memory 209 or other machine readable media and transmit the media access information 518 to the optical media drive 104. Upon receipt of the media access information 518, the optical media drive 104 may then access the optical media using the media access information 518 received from multimedia player application 204.

It should be noted that in addition to multimedia player application 204, a variety of other applications may also be configured to store and handle media access information 518 received from optical media drive 104. For example, a device driver included in the operating system 210 for the operating optical media drive 104 may also be configured to store the media access information 518.

Figure 8A:
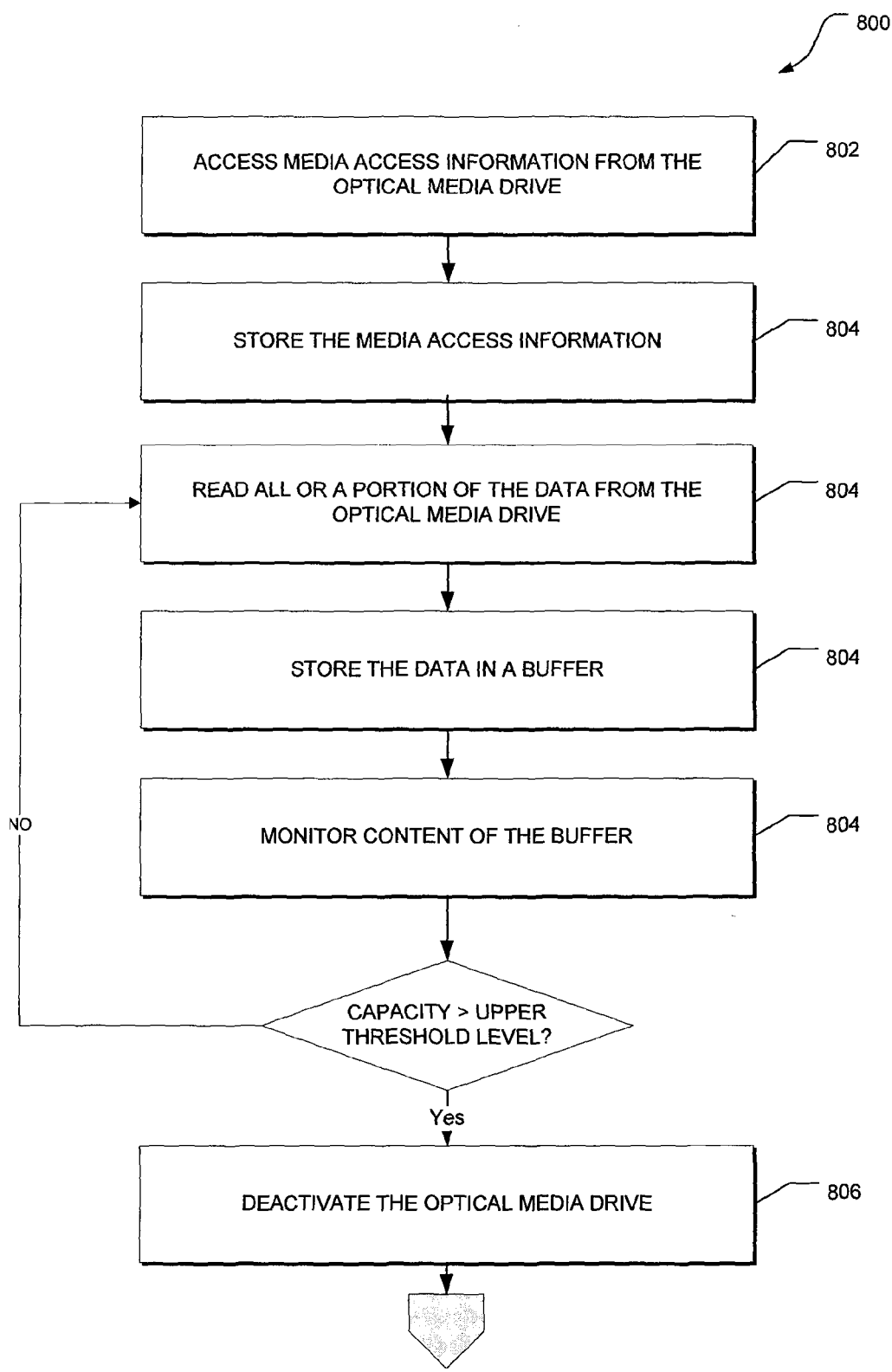
FIGS. 8A and 8B depict a flow diagram of detailed methods, in accordance with an example embodiment, of a multimedia player application storing media access information received from an optical media drive.
Figure 8B:
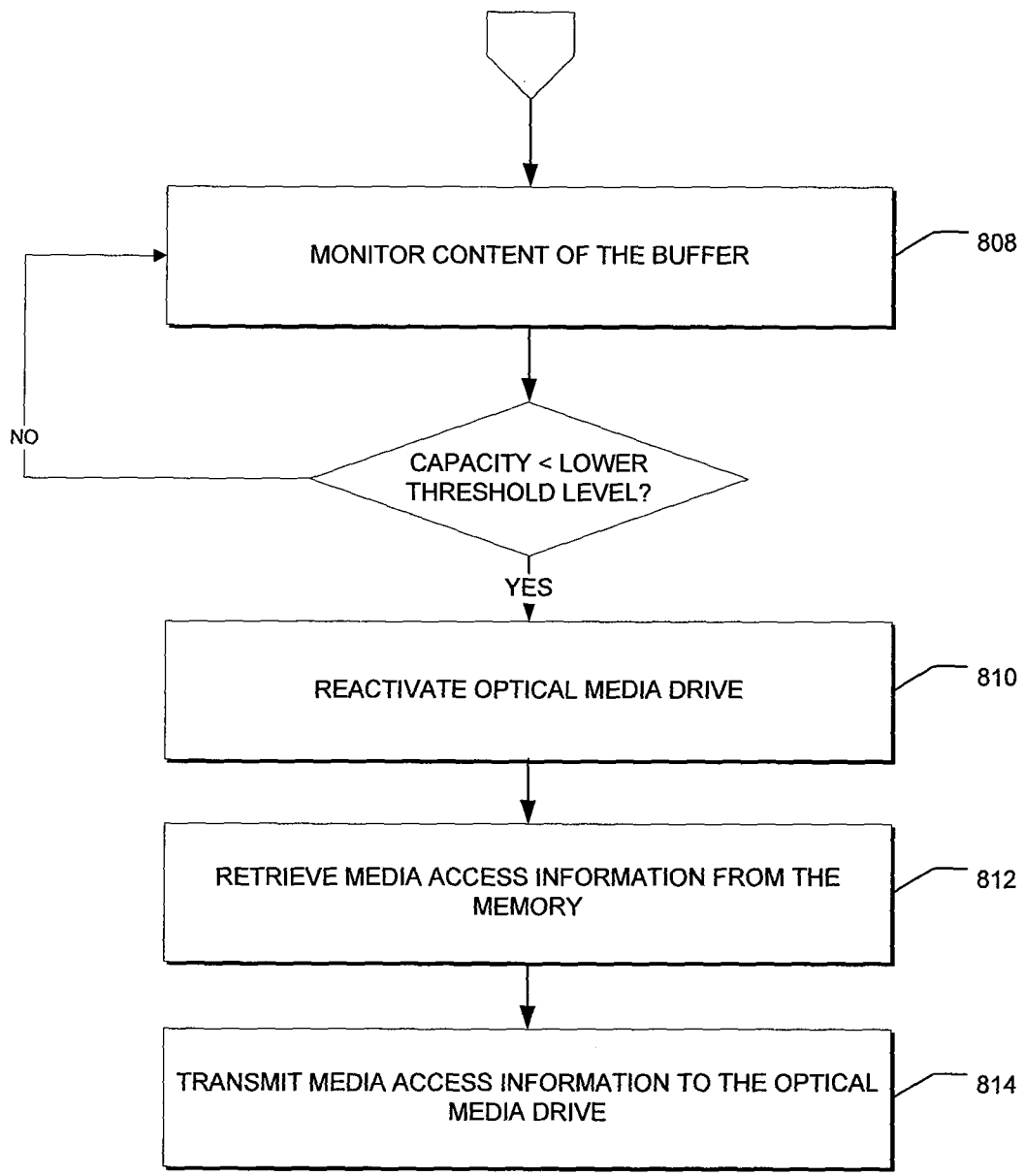

FIGS. 8A and 8B depict a flow diagram of detailed methods, in accordance with an example embodiment, of a multimedia player application storing media access information received from an optical media drive. In an example embodiment, method 800 may be implemented by the multimedia player application 204 of FIG. 2 and employed in computing device 200. As depicted in FIG. 8A, the multimedia player application access media accesses information from an optical media drive at 802. Unlike accessing data stored on an optical media, an example of an access operation by the multimedia player application may include the multimedia player application transmitting a request for the media access information to the optical media drive and then receiving the media access information in response. Alternatively, the multimedia player application may periodically receive the media access information without transmitting a request.

The multimedia player application then stores the media access information at 804 in memory or other machine readable media. The optical media drive is then instructed to read all or a portion of data stored on the optical media drive at 804. The data read from the optical media is stored in a buffer at 804 and a content of the buffer is monitored at 804 by, for example, comparing the buffer capacity to an upper threshold parameter. In an example embodiment, an upper threshold value and a lower threshold value may be defined. This upper threshold value is higher than the lower threshold value. An example of an upper threshold may include 90% of maximum capacity of a buffer. An example of a lower threshold value is 10% of the maximum capacity.

If the buffer capacity is below the upper threshold parameter, then a next portion of the data is read from the optical drive and stored in the buffer. On the other hand, if the buffer capacity exceeds the upper threshold parameter, then power is removed from the optical media drive at 806. At this time, the multimedia player application may play or read the data from the buffer. As depicted in FIG. 8B, the buffer capacity is continuously monitored at 808 when the optical drive is deactivated. If the buffer capacity is reduced below the lower threshold parameter, then the optical media drive is reactivated at 810. The multimedia player application then retrieves the media access information from the memory at 812 and then transmits the media access information to the optical media drive at 814. The optical media drive may then read a next portion of the data from the optical media using the received media access information.

Figure 9:
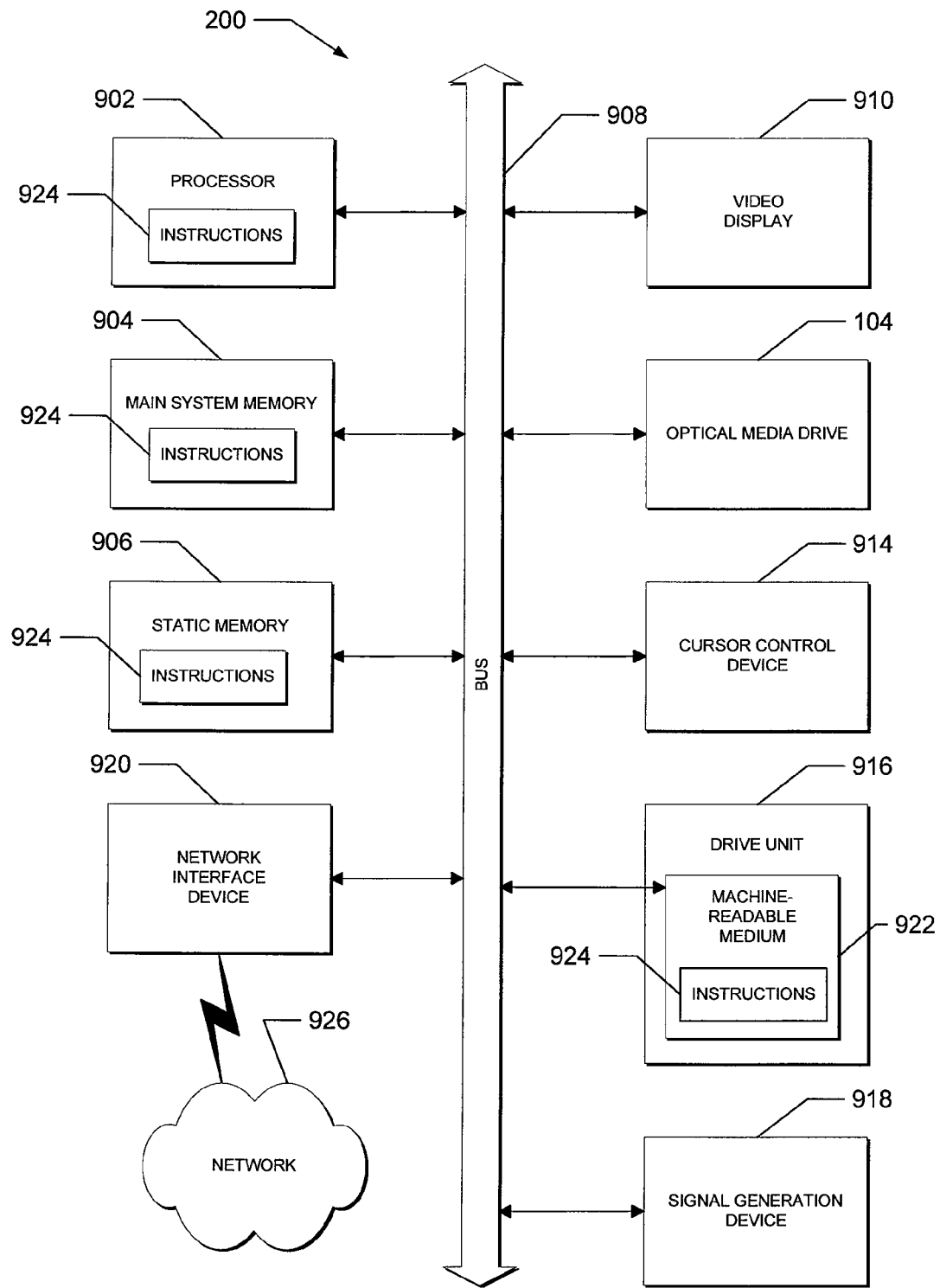
FIG. 9 depicts a simplified block diagram of a machine in the example form of a computing device within which a set of instructions, for causing the machine to perform any one or more of the methodologies discussed herein, may be executed.

FIG. 9 depicts a simplified block diagram of a machine in the example form of a computing device within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

Example computing device 200 includes processor 902 (e.g., a central processing unit (CPU), a graphics processing unit (GPU) or both), main system memory 904 and static memory 906, which communicate with each other via bus 908. Computing device 200 may further include video display unit 910 (e.g., a plasma display, a liquid crystal display (LCD) or a cathode ray tube (CRT)). Computing device 200 also includes optical media drive 104, user interface (UI) navigation device 914 (e.g., a mouse), disk drive unit 916, signal generation device 918 (e.g., a speaker) and network interface device 920.

Disk drive unit 916 includes machine-readable medium 922 on which is stored one or more sets of instructions and data structures (e.g., software 924) embodying or utilized by any one or more of the methodologies or functions described herein. Software 924 may also reside, completely or at least partially, within main system memory 904 and/or within processor 902 during execution thereof by computing device 200, with main system memory 904 and processor 902 also constituting machine-readable, tangible media. Software 924 may further be transmitted or received over network 926 via network interface device 920 utilizing any one of a number of well-known transfer protocols (e.g., Hypertext Transfer Protocol (HTTP)).

While machine-readable medium 922 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for reading data from optical media drives may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of playing a multimedia file stored on an optical media accessed by an optical media drive, the method comprising the acts of:
    detecting media access information determined by the optical media drive to access the optical media;
    storing the media access information in a memory, the memory configured to retain the media access information after the optical media drive is deactivated;
    reading at least a portion of the multimedia file from the optical media drive at a data read speed greater than a playback speed used in playback of the multimedia file;
    storing the read portion of the multimedia file in a buffer;
    deactivating the optical media drive in reference to a first threshold parameter;
    reactivating the optical media drive in reference to a second threshold parameter;
    retrieving the media access information from the memory; and
    reading from the optical media using the media access information read from the memory.

2. The method of claim 1, wherein the act of deactivating the optical media drive includes stopping a flow of electric charge to the optical media drive.

3. The method of claim 1, further comprising the act of playing the read portion of the multimedia file from the buffer.

4. The method of claim 1, further comprising the act of monitoring a capacity of the buffer, the capacity identifying an amount of the read portion of the multimedia file stored in the buffer.

5. The method of claim 1, wherein the act of detecting the media access information includes reading the media access information from the optical media.

6. The method of claim 1, wherein the memory configured to store the media access information is a non-volatile memory included in the optical media drive.

7. The method of claim 1, wherein the memory configured to store the media access information is a main system memory included in a computing device, the computing device configured to play the multimedia file.

8. The method of claim 1, wherein the media access information includes an attribute of the optical media.

9. The method of claim 8, wherein the attribute includes an optical media type.

10. The method of claim 1, wherein the media access information includes an attribute of the optical media and a parameter associated with accessing the optical media.

11. A machine-readable medium that stores instructions, which when performed by a machine, cause the machine to perform operations comprising:
    accessing media access information determined by an optical media drive to access an optical media;
    storing the media access information in a memory, the memory configured to retain the media access information after the optical media drive is deactivated;
    reading at least a portion of data from the optical media drive at a data read speed greater than a playback speed used in playback of the data;
    storing the read portion of the data in a buffer;
    deactivating the optical media drive in reference to a first threshold parameter;
    reactivating the optical media drive in reference to a second threshold parameter;
    retrieving the media access information from the memory; and
    transmitting the media access information to the optical media drive.

12. The machine-readable medium of claim 11, wherein the operation of accessing the media access information causes the machine to perform operations comprising:
    transmitting a request to the optical media drive for the media access information; and
    receiving the media access information from the optical media drive.

13. The machine-readable medium of claim 11, wherein the media access information is detected by the optical media drive.

14. The machine-readable medium of claim 11, wherein the media access information includes an attribute of the optical media, the attribute including at least one of an optical media type or a manufacturer identifier.

15. The machine-readable medium of claim 14, wherein the media access information further includes a parameter associated with the accessing of the optical media, the parameter including at least one of a focus servo gain and compensation, a tracking movement, a tilt movement, a linear velocity, a modulation, a disk imbalance parameter or a bit rate.

16. The machine-readable medium of claim 11, wherein the memory is included in the machine and located outside of the optical media drive.

17. The machine-readable medium of claim 11, further comprising the act of monitoring a capacity of the buffer, the capacity identifying an amount of the read portion of the data stored in the buffer.

* * * * *